(12) United States Patent
Park et al.

(10) Patent No.: US 11,561,426 B2
(45) Date of Patent: Jan. 24, 2023

(54) OPTICAL FILM

(71) Applicant: LG CHEM, LTD., Seoul (KR)

(72) Inventors: Jae Hong Park, Daejeon (KR); Hyung Il Yang, Daejeon (KR); Kee Young Lee, Daejeon (KR); Keon Woo Kim, Daejeon (KR); Sang Jo Bae, Daejeon (KR); Woo Yong Cho, Daejeon (KR); Sung Yoon Lee, Daejeon (KR); Kyung Gu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 6 days.

(21) Appl. No.: 17/261,396

(22) PCT Filed: Jul. 26, 2019

(86) PCT No.: PCT/KR2019/009328
§ 371 (c)(1),
(2) Date: Jan. 19, 2021

(87) PCT Pub. No.: WO2020/022832
PCT Pub. Date: Jan. 30, 2020

(65) Prior Publication Data
US 2021/0349336 A1    Nov. 11, 2021

(30) Foreign Application Priority Data

Jul. 26, 2018    (KR) .......................... 10-2018-0087290

(51) Int. Cl.
*G02F 1/1334*    (2006.01)
*G02F 1/1335*    (2006.01)
(Continued)

(52) U.S. Cl.
CPC .......... *G02F 1/1334* (2013.01); *G02F 1/1337* (2013.01); *G02F 1/133528* (2013.01); *G02F 1/133634* (2013.01)

(58) Field of Classification Search
None
See application file for complete search history.

(56) References Cited

U.S. PATENT DOCUMENTS

2002/0187283 A1\* 12/2002 Gu ....................... G02B 5/3016
428/1.2
2006/0077547 A1    4/2006 Choi et al.
(Continued)

FOREIGN PATENT DOCUMENTS

CN        101782701 A        7/2010
JP        2007147898 A  *    6/2007
(Continued)

OTHER PUBLICATIONS

Ciba Irgacure 651 (Year: 2001).\*

*Primary Examiner* — Phu Vu
(74) *Attorney, Agent, or Firm* — Dentons US LLP

(57) ABSTRACT

The present application provides an optical film. By controlling transmittance of a liquid crystal layer comprising a radical initiator for the maximum absorption wavelength of the radical initiator, the present application can provide an optical film having a liquid crystal layer having excellent resistance to external stimuli and excellent optical properties. Such an optical film can have various forms and can be used in various fields.

19 Claims, 2 Drawing Sheets

(51) Int. Cl.
    *G02F 1/13363*    (2006.01)
    *G02F 1/1337*     (2006.01)

(56)           References Cited

U.S. PATENT DOCUMENTS

| | | |
|---|---|---|
| 2010/0182547 A1 | 7/2010 | Ryu et al. |
| 2014/0307218 A1* | 10/2014 | Ryu ................... C09K 19/3809 349/187 |
| 2019/0237515 A1* | 8/2019 | Jung ........................ G02B 5/30 |
| 2020/0264461 A1* | 8/2020 | Kuwana ............... C09K 19/601 |
| 2021/0020870 A1* | 1/2021 | Osato ..................... H05B 33/02 |

FOREIGN PATENT DOCUMENTS

| | | |
|---|---|---|
| JP | 2011-186158 A | 9/2011 |
| JP | 2015-57646 A | 3/2015 |
| KR | 20090075346 A | 7/2009 |
| KR | 10-1056683 B1 | 8/2011 |
| KR | 10-1573976 B1 | 12/2015 |
| KR | 20160121426 A | 10/2016 |
| KR | 10-1726407 B1 | 4/2017 |
| TW | 200613782 A | 5/2006 |
| TW | 201343880 A | 11/2013 |

* cited by examiner

[Figure 1]
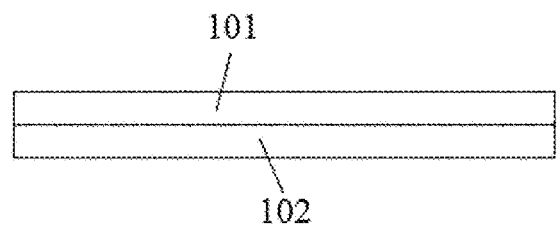
[Figure 2]
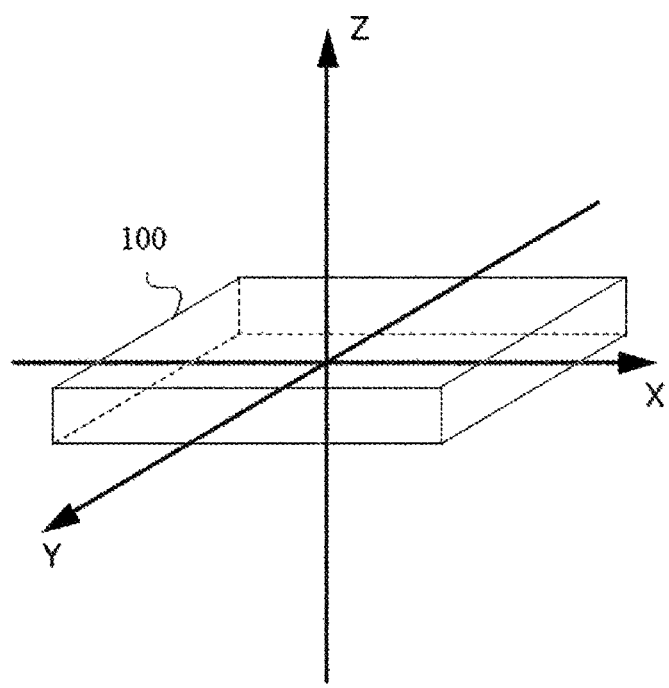
[Figure 3]
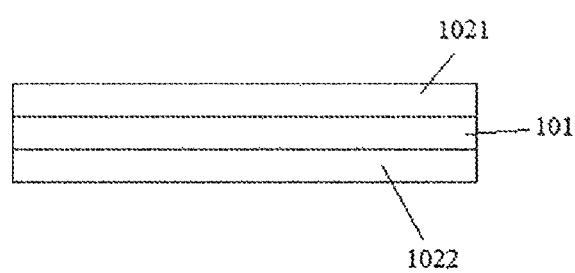

[Figure 4]
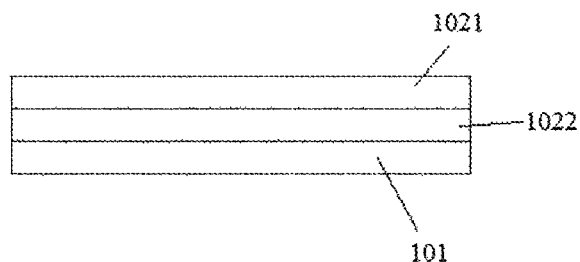
[Figure 5]
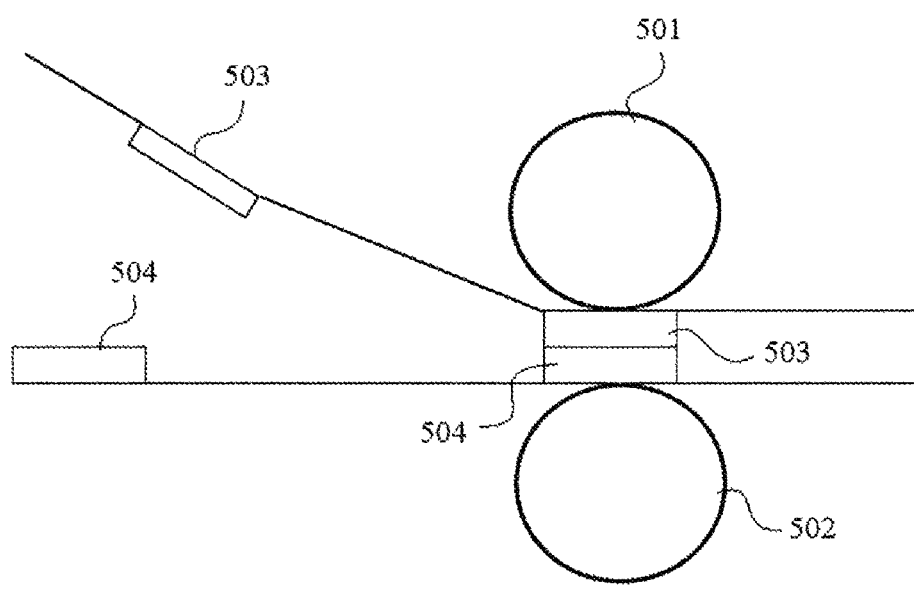

OPTICAL FILM

The present application is a National Phase entry pursuant to 35 U.S.C. § 371 of International Application No. PCT/KR2019/009328 filed on Jul. 26, 2019, and claims priority to and the benefit of Korean Patent Application No. 10-2018-0087290 filed on Jul. 26, 2018, the disclosures of which are incorporated herein by reference in their entirety.

FIELD

The present application relates to an optical film.

BACKGROUND

Optical films having birefringence can be used in various fields. For example, phase difference films can be used for implementation of high quality images in LCDs (liquid crystal displays) or PDPs (plasma display panels), and the like. These films can also be used for improvement of screen uniformity, contrast ratios and viewing angle characteristics, and the like, or so-called QWPs (quarter wave plates) used for antireflection in OLEDs (organic light emitting diodes), and the like, are also optical films having birefringence.

Liquid crystal films, produced by polymerizing polymerizable liquid crystal compounds, having birefringence are known.

Liquid crystal molecules may be divided into rod-shaped liquid crystals and discotic liquid crystals, depending on their shape. There are also various orientational forms including a planar, homeotropic, tilted, spray or cholesteric orientations. Therefore, the liquid crystal films can have various optical properties which cannot be obtained with stretched films.

The liquid crystal film can be manufactured by generally forming an alignment layer with orientation on a base film, and orienting and polymerizing a polymerizable liquid crystal compound on the alignment layer.

The liquid crystal layer of the liquid crystal film thus produced should not be damaged by external stimuli. For example, the liquid crystal layer may be exposed to various external stimuli in a process of applying the produced liquid crystal film. For example, when a roll-to-roll process is performed in a process of manufacturing an additional optical film such as a polarizing plate using the liquid crystal film, or applying the liquid crystal film to a device, a stimulus is applied to the liquid crystal layer by the pressure of the roll, or a stimulus is applied thereto in a suction process for fixing a film or the like, whereby damage such as optical stains may occur in a portion thereof to which the stimulus is applied, and such damage needs to be prevented.

SUMMARY

The present application provides an optical film having a liquid crystal layer in which damage is prevented even when exposed to external stimuli.

The optical film of the present application comprises a base film and a liquid crystal layer formed on one side of the base film.

According to certain aspects, the present invention provides an optical film, comprising: a base film; and a liquid crystal layer on one side of the base film, wherein the liquid crystal layer comprises polymerizable liquid crystal compounds in a polymerized form, wherein the liquid crystal layer further comprises a radical initiator, and wherein the optical film has transmittance of 52% or more at the maximum absorption wavelength of the radical initiator.

According to further aspects, the present invention provides an optical film, comprising: a first liquid crystal layer; and a second liquid crystal layer on one side of the first liquid crystal layer, wherein the first liquid crystal layer comprises first polymerizable liquid crystal compounds in a polymerized form, wherein the first liquid crystal layer further comprises a first radical initiator, wherein the second liquid crystal layer comprises second polymerizable liquid crystal compounds in a polymerized form, wherein the second liquid crystal layer further comprises a second radical initiator, and wherein transmittance of a structure comprising the first liquid crystal layer and the second liquid crystal layer is 25% or more at the maximum absorption wavelength of the first radical initiator or at the maximum absorption wavelength of the second radical initiator.

According to additional aspects, the present invention provides a polarizing plate, comprising: a polarizer; and a liquid crystal layer on one side of the polarizer, wherein the liquid crystal layer comprises polymerizable liquid crystal compounds in a polymerized form, wherein the liquid crystal layer further comprises a radical initiator, and wherein the liquid crystal layer has transmittance of 52% or more at the maximum absorption wavelength of the radical initiator.

BRIEF DESCRIPTION OF THE DRAWINGS

FIGS. 1, 3 and 4 are structures of exemplary optical films.

FIG. 2 is a diagram for explaining Nx, Ny and Nz of a liquid crystal layer.

FIG. 5 is a schematic diagram of a method for evaluating optical stains in an example.

DETAILED DESCRIPTION

FIG. 1 is a schematic diagram of the optical film, which is an example of the optical film comprising a base film (101) and a liquid crystal layer (102) formed on one side thereof. Here, the liquid crystal layer comprises a polymerizable liquid crystal compound in a polymerized state, and further comprises a radical initiator.

Here, the radical initiator is used to generate radicals for initiating polymerization of the polymerizable liquid crystal compound in a manufacturing process of an optical film, which may be included in a state after generating radicals in the liquid crystal layer or before generating radicals.

The optical film of the present application may have transmittance of 52% or more at the maximum absorption wavelength of the radical initiator. Here, the maximum absorption wavelength generally refers to a region in which absorption peaks are observed in an absorption spectrum of the radical initiator or a wavelength range in which the highest extinction coefficient is shown. The transmittance of the optical film may be mainly influenced by the amount of the radical initiator (the radical initiator in a state before generating radicals) remaining after initiating the polymerization of the polymerizable liquid crystal compound in the liquid crystal layerZSD bcbxvcb. If curing conditions such as polymerization conditions and ultraviolet curing conditions are controlled such that the radical initiator remains so that the transmittance of the optical film may be 52% or more during the manufacturing process of the liquid crystal layer, the liquid crystal layer is cured while having an appropriate degree of curing, and such a liquid crystal layer may have stable resistance to external stimuli.

Here, the maximum absorption wavelength of the radical initiator is not particularly limited. That is, the radical initiator is selected in consideration of the type of polymerizable liquid crystal compound used or the process conditions, and the like, and the maximum absorption wavelength of the radical initiator thus selected may be a reference for the transmittance. The maximum absorption wavelength may be, for example, in a range of about 300 nm to 310 nm. Therefore, the transmittance may be measured for any wavelength within the range of 300 nm to 310 nm, or may be the maximum or minimum transmittance among the transmittance measured within the range.

In another example, the transmittance may be about 52.5% or more, about 53% or more, about 53.5% or more, about 54% or more, about 54.5% or more, about 55% or more, about 55.5% or more, about 56% or more, about 56.5% or more, about 57% or more, about 57.5% or more, about 58% or more, about 58.5% or more, about 59% or more, about 59.5% or more, or about 60% or more.

The upper limit of the transmittance is not particularly limited. However, when the amount of the residual initiator is controlled to such an extent that the transmittance is too high, adhesiveness of the liquid crystal layer to a base material may be lowered. Thus, the transmittance may be about 95% or less, 90% or less, 85% or less, 80% or less, 75% or less, 70% or less, about 65% or less, or about 60% or less or so.

In the optical film of the present application, the base film may also be used as part of the optical film, or may also be applied so that it may be separated upon application of the optical film. When the base film is separated upon application of the optical film, the optical film may be a so-called transfer film. That is, the liquid crystal layer and/or the alignment layer formed on the base film is transferred to another element using a pressure-sensitive adhesive or an adhesive in the application process of the optical film, and as a result, the base film can be separated. The kind of base film used in the optical film of the present application is not particularly limited, where a known film applied in a manufacturing field of an optical film can be used. Such a base film includes, for example, a glass film or a plastic film, and the like. Here, the plastic film may be exemplified by a cellulose film such as TAC (triacetyl cellulose) or DAC (diacetyl cellulose); a cyclo olefin polymer (COP) film such as norbornene derivatives; an acrylic film such as PMMA (poly(methyl methacrylate)); a polycarbonate (PC) film; a polyolefin film such as PE (polyethylene) or PP (polypropylene); a polyvinyl alcohol (PVA) film; a polyethersulfone (PES) film; a polyetheretherketon (PEEK) film; a polyetherimide (PEI) film; a polyethylenenaphthalate (PEN) film; a polyester film such as PET (polyethyleneterephthalate); a polyimide (PI) film; a polysulfone (PSF) film; or a fluoropolymer film such as an amorphous fluorine resin, and the like.

In general, such a base film has transmittance of about 80% or more or so at the maximum absorption wavelength. The optical film may exhibit the aforementioned transmittance in a state where the liquid crystal layer is formed on the base film. In another example, the transmittance of the base film may be about 82% or more, about 84% or more, about 86% or more, or about 88% or more, and may be about 100% or less, about 96% or less, or about 92% or less or so.

The transmittance of the base film may be measured for the maximum absorption wavelength, for example, any wavelength within the range of 300 nm to 310 nm, or may be the maximum or minimum transmittance of the transmittance measured within the range.

The base film may be an isotropic film without birefringence or a birefringence film with birefringence.

The thickness of the base film is not particularly limited, which may be controlled in an appropriate range according to the purpose.

A liquid crystal layer may be formed on the base film. The liquid crystal layer may comprise a polymerizable liquid crystal compound, and the liquid crystal compound may be included in a polymerized state in the liquid crystal layer. In the present application, the term "polymerizable liquid crystal compound" may mean a compound comprising a site capable of exhibiting liquid crystallinity, for example, a mesogen skeleton or the like, and also comprising one or more polymerizable functional groups. In addition, "the polymerizable liquid crystal compound is included in a polymerized form" may mean a state where the liquid crystal compound is polymerized to form a skeleton such as a main chain or side chain of the liquid crystal polymer in the liquid crystal layer.

The liquid crystal layer may comprise such a polymerizable liquid crystal compound as a main component. That is, the liquid crystal layer may comprise the polymerizable liquid crystal compound in an amount of 55% or more, 60% or more, 65% or more, 70% or more, 75% or more, 80% or more, 85% or more, or 90% or more on the basis of weight. The ratio may be, for example, less than about 100%.

The liquid crystal layer may also comprise a polymerizable liquid crystal compound in a non-polymerized state, or may further comprise a known additive such as a polymerizable non-liquid crystal compound, a stabilizer, a non-polymerizable non-liquid crystal compound or an initiator.

In one example, the polymerizable liquid crystal compound included in the liquid crystal layer may be a polyfunctional and/or monofunctional polymerizable liquid crystal compound.

The term "polyfunctional polymerizable liquid crystal compound" may mean a compound containing two or more polymerizable functional groups of the liquid crystal compounds. In one example, the polyfunctional polymerizable liquid crystal compound may contain 2 to 10, 2 to 8, 2 to 6, 2 to 5, 2 to 4, 2 to 3 or two polymerizable functional groups. In addition, the term "monofunctional polymerizable liquid crystal compound" may mean a compound having one polymerizable functional group of the liquid crystal compounds.

In one example, the polyfunctional or monofunctional polymerizable liquid crystal compound may be a compound represented by the following formula 1.

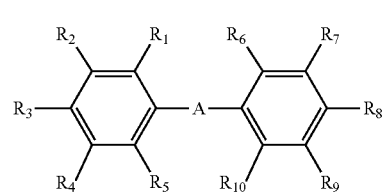

[Formula 1]

In Formula 1, A is a single bond, —COO— or —OCO—, and $R_1$ to $R_{10}$ are each independently hydrogen, halogen, an alkyl group, an alkoxy group, an alkoxycarbonyl group, a cyano group, a nitro group, —O-Q-P or a substituent of the following formula 2, or a pair of two adjacent substituents of $R_1$ to $R_5$ or a pair of two adjacent substituents of $R_6$ to $R_{10}$ are connected to each other to form benzene substituted with —O-Q-P, provided that at least one of $R_1$ to $R_{10}$ is —O-Q-P or a substituent of the following formula 2, or at least one pair of two adjacent substituents of $R_1$ to $R_5$ or two adjacent substituents of $R_6$ to $R_{10}$ are connected to each other to form benzene substituted with —O-Q-P, wherein Q is an alkylene group or an alkylidene group and P is a polymerizable functional group such as an alkenyl group, an epoxy group, a cyano group, a carboxyl group, an acryloyl group, a methacryloyl group, an acryloyloxy group or a methacryloyloxy group.

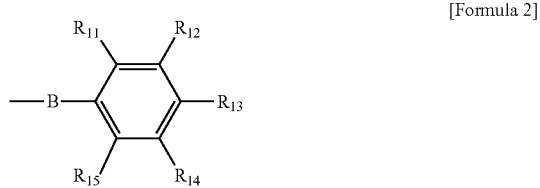

[Formula 2]

In Formula 2, B is a single bond, —COO— or —OCO—, and $R_{11}$ to $R_{15}$ are each independently hydrogen, halogen, an alkyl group, an alkoxy group, an alkoxycarbonyl group, a cyano group, a nitro group or —O-Q-P, or a pair of two adjacent substituents of Ruu to $R_{15}$ are connected to each other to form benzene substituted with —O-Q-P, provided that at least one of $R_{11}$ to $R_{15}$ is —O-Q-P, or a pair of two adjacent substituents of $R_{11}$ to $R_{15}$ are connected to each other to form a benzene substituted with —O-Q-P, wherein Q is an alkylene group or an alkylidene group and P is a polymerizable functional group such as an alkenyl group, an epoxy group, a cyano group, a carboxyl group, an acryloyl group, a methacryloyl group, an acryloyloxy group or a metacryloyloxy group.

In Formulas 1 and 2 above, the fact that two adjacent substituents are connected to each other to form benzene substituted with —O-Q-P may mean that two adjacent substituents are connected to each other to form a naphthalene skeleton substituted with —O-Q-P as a whole.

In Formula 2, "—" on the left side of B may mean that B is directly connected to the benzene of Formula 1.

In Formulas 1 and 2, the term "single bond" means a case where no separate atom is present in the moiety represented by A or B. For example, when A in Formula 1 is a single bond, benzene on both sides of A may be directly connected to form a biphenyl structure.

In Formulas 1 and 2, the halogen can be exemplified by, for example, chlorine, bromine or iodine, and the like.

In this specification, the term "alkyl group" may mean, for example, a linear or branched alkyl group having 1 to 20 carbon atoms, 1 to 16 carbon atoms, 1 to 12 carbon atoms, 1 to 8 carbon atoms or 1 to 4 carbon atoms, or may mean, for example, a cycloalkyl group having 3 to 20 carbon atoms, 3 to 16 carbon atoms or 4 to 12 carbon atoms, unless otherwise specified. The alkyl group may be optionally substituted by one or more substituents.

In this specification, the term "alkoxy group" may mean, for example, an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be linear, branched or cyclic. In addition, the alkoxy group may be optionally substituted by one or more substituents.

Also, in this specification, the term "alkylene group" or "alkylidene group" may mean, for example, an alkylene group or alkylidene group having 1 to 12 carbon atoms, 4 to 10 carbon atoms or 6 to 9 carbon atoms, unless otherwise specified. The alkylene group or alkylidene group may be, for example, linear, branched or cyclic. In addition, the alkylene group or alkylidene group may be optionally substituted by one or more substituents.

Furthermore, in this specification, the "alkenyl group" may mean an alkenyl group having 2 to 20 carbon atoms, 2 to 16 carbon atoms, 2 to 12 carbon atoms, 2 to 8 carbon atoms or 2 to 4 carbon atoms, unless otherwise specified. The alkenyl group may be, for example, linear, branched or cyclic. In addition, the alkenyl group may be optionally substituted by one or more substituents.

In addition, in Formulas 1 and 2, P may be, for example, an acryloyl group, a methacryloyl group, an acryloyloxy group or a methacryloyloxy group, or may be an acryloyloxy group or a methacryloyloxy group, and in another example, it may be an acryloyloxy group.

In this specification, the substituent capable of being substituted in the specific functional group can be exemplified by an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, and the like, but is not limited thereto.

—O-Q-P in Formulas 1 and 2, in which at least one may be present, or the residue of Formula 2 may be present, for example, at a position of $R_3$, $R_8$ or $R_{13}$. Also, the substituents connected to each other to constitute benzene substituted with —O-Q-P may be, for example, $R_3$ and $R_4$, or $R_{12}$ and $R_{13}$. Furthermore, substituents other than the residue of Formula 2 or —O-Q-P in the compound of Formula 1 above or the residue of Formula 2, or substituents other than the substituents connected to each other to form benzene may be, for example, hydrogen, halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group or a nitro group, and in another example, they may be chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms or a cyano group.

The polymerizable liquid crystal compound may exist in various orientation states in the liquid crystal layer. For example, the liquid crystal compound may be included in homogeneous orientation, homeotropic orientation, tilted orientation, splay orientation and/or cholesteric orientation states.

The liquid crystal layer comprises a radical initiator together with the polymerizable liquid crystal compound. Such a radical initiator is used for polymerization of the polymerizable liquid crystal compound, which may exist in a state of generating radicals, or may exist in a state after generating radicals, as described above.

A photo-radical initiator can be used as the radical initiator. The photo-radical initiator is an initiator capable of initiating polymerization of a polymerizable liquid crystal compound by light irradiation. Here, the term light irradiation may include irradiation of particle beams such as alpha-particle beams, neutron beams or electron beams as well as electromagnetic waves such as microwaves, infrared rays (IR), ultraviolet rays (UV), X-rays or gamma rays.

The type of the radical initiator can be exemplified by initiators such as benzyl or bibenzoyl, benzoin isobutyl ether, benzoin isopropyl ether, benzophenone, benzoylbenzoic acid, methyl benzoylbenzoate, 4-benzoyl-4'-methyldiphenyl sulfide, benzyl methyl ketal, dimethylaminomethylbenzoate, 2-n-butoxyethyl-4-dimethylaminobenzoate, isoamyl p-dimethylaminobenzoic acid, 3,3'-dimethyl-4-methoxybenzophenone, methyl benzoylformate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone or 1-chloro-4-propoxythioxanthone, and the radical initiator may be used in combination with an appropriate sensitizer, if necessary.

Among the exemplary radical initiators as described above, the initiator having a maximum absorption wavelength in a range of 300 nm to 310 nm can be exemplified by 2-methyl-1-(4-methylthiophen-2-yl)-2-morpholin-4-yl-propan-1one (e.g. Irgacure 907) and the like, but is not limited thereto.

The specific ratio of the radical initiator in the liquid crystal layer may be appropriately selected in consideration of polymerization efficiency of a polymerizable liquid crystal composition and the transmittance after the polymerization process, and for example, the radical initiator may be included in the liquid crystal composition at a ratio of 1 to 20 parts by weight relative to 100 parts by weight of the polymerizable orientation liquid crystal compound. While suitable polymerization is induced under this ratio, the liquid crystal layer after polymerization may exhibit the above-mentioned transmittance characteristics.

The liquid crystal layer may comprise the aforementioned polymerizable liquid crystal compound and radical initiator as basic components, and may further comprise any known additive, if necessary. Such an additive can be exemplified by a polymerizable non-liquid crystal compound, a stabilizer, a surfactant, a leveling agent, a non-polymerizable non-liquid crystal compound or a sensitizer, and the like, but is not limited thereto.

Such a liquid crystal layer has birefringence. The birefringence represented by the liquid crystal layer is not particularly limited, which may be appropriately selected depending on the applied use.

In addition, the thickness of the liquid crystal layer is not particularly limited, which may be set in an appropriate range in consideration of the desired phase difference of the liquid crystal layer.

In the optical film, an alignment layer for orientation of the liquid crystal compound in the liquid crystal layer may be further present between the liquid crystal layer and the base film.

As the alignment layer, a known alignment layer can be used without any particular limitation. For example, the alignment layer may be, for example, a resin film, a photo-alignment layer or a rubbing treatment film, such as polyimide that is subjected to rubbing, and the like, which provides a plurality of patterned groove regions.

In one example, when the photo-alignment layer is applied, the photo-alignment layer may exhibit orientation through a photopolymerization reaction of cinnamate, coumarin, chalcone, stilbene or diazo, and the like, a photoisomerization reaction of cis-trans isomerization, and reactions such as molecular chain cleavage of decomposition by a light reaction with ultraviolet irradiation.

When the photo-alignment layer is applied, the photo-alignment layer may also comprise a radical initiator. In this case, as the radical initiator, an initiator whose maximum absorption wavelength (W1) is different from the maximum absorption wavelength (W2) of the radical initiator included in the liquid crystal layer by 20 nm or more is applied. Through this application, the degree of curing of the liquid crystal layer and the above-mentioned transmittance can be set in the target range. That is, the absolute value of the difference (W1-W2) of the maximum absorption wavelengths (W1 and W2) may be 20 nm or more. In another example, the absolute value may be 25 nm or more, 30 nm or more, 35 nm or more, 40 nm or more, 45 nm or more, or 50 nm or more. In one example, the absolute value may be 200 nm or less, 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, or 60 nm or less.

By applying such an initiator, the alignment layer can exhibit appropriate transmittance for the maximum absorption wavelength of the radical initiator contained in the liquid crystal layer. The range of the transmittance may be, for example, about 75% or more, about 80% or more, about 85% or more, or about 90% or more. The upper limit of the transmittance range is not particularly limited, which may be, for example, about 100% or less, or about 95% or less or so.

Here, the specific kind of the applied radical initiator is not particularly limited, and for example, an appropriate kind can be selected without limitation from the kinds of radical initiators included in the liquid crystal layer as described above.

Such an optical film of the present application may exist in various structures. For example, the optical film may be in a form including at least two or more liquid crystal layers exhibiting the above-described specific transmittance.

That is, for example, the optical film may comprise a first liquid crystal layer including a first polymerizable liquid crystal compound in a polymerized form and further including a first radical initiator; and a second liquid crystal layer formed on one side of the first liquid crystal layer, including a second polymerizable liquid crystal compound in a polymerized form and further including a second radical initiator.

The first and second liquid crystal layers may each exhibit transmittance characteristics as described above. For example, the first liquid crystal layer may have transmittance of 53% or more for the maximum absorption wavelength of the first radical initiator, and the second liquid crystal layer may have transmittance of 53% or more for the maximum absorption wavelength of the second radical initiator. The specific range of each transmittance is as described above, and for example, the transmittance may be measured in a state where each of the liquid crystal layers is placed alone on a base film having the characteristics as mentioned above. The kind of the specific polymerizable liquid crystal compound or the kind of the radical initiator applied to each of the liquid crystal layers, and the specific range of each transmittance are as described above.

In addition, the transmittance of the entire first and second liquid crystal layers for the maximum absorption wavelength of the first radical initiator or the maximum absorption wavelength of the second radical initiator may be 25% or more. In another example, the transmittance may be about 26% or more, about 27% or more, about 28% or more, about 29% or more, or about 30% or more. The upper limit of the transmittance is not particularly limited, and considering the amount of the remaining initiator, it may be adjusted at about 95% or less, 90% or less, 85% or less, 80% or less, 75% or less, 70% or less, about 65% or less, about 60% or less, about 55% or less, about 50% or less, about 45% or less, about 40% or less, about 35% or less, or about 30% or less.

The optical film having such a structure can be usefully used for optical compensation of LCDs (liquid crystal displays), particularly IPS (in-plane switching) LCDs.

In this case, for example, the first liquid crystal layer may have a refractive index relationship according to Equation 1 or 2 below.

$$Nx>Ny=Nz \quad \text{[Equation 1]}$$

$$Nx>Ny>Nz \quad \text{[Equation 2]}$$

In Equations 1 and 2 above, Nx, Ny and Nz are the refractive index in the x-axis direction (slow axis direction), the refractive index in the y-axis direction (fast axis direction) and the refractive index in the z-axis direction (thickness direction), respectively, where these definitions apply equally in this specification, unless otherwise specified. Here, for example, as shown in FIG. 2, the x-axis direction may mean the slow axis direction on the plane of the liquid crystal layer (100) in the form of a film or sheet, the y-axis direction may mean the plane direction (fast axis direction) perpendicular to the x-axis, and the z-axis direction may mean the normal direction of the plane formed by the x-axis and the y-axis, for example, the thickness direction.

In this specification, the term refractive index is a refractive index for light having a wavelength of about 550 nm, unless otherwise specified.

In this case, the first liquid crystal layer may have an in-plane phase difference according to Equation A below in a range of 60 nm to 180 nm or 90 nm to 180 nm.

$$Rin=d \times (Nx-Ny) \quad \text{[Equation A]}$$

In Equation A, Rin is an in-plane phase difference, Nx and Ny are as defined in Equations 1 and 2 above, and d is the thickness (unit: nm) of the liquid crystal layer.

In addition, the first liquid crystal layer may have a thickness direction phase difference according to Equation B below in a range of −130 nm to −40 nm.

$$Rth=d \times (Nz-(Nx+Ny)/2) \quad \text{[Equation B]}$$

In Equation B, Rth is a thickness direction phase difference, Nx and Ny are as defined in Equations 1 and 2 above, and d is the thickness (unit: nm) of the liquid crystal layer.

In addition, the second liquid crystal layer may have a refractive index relationship according to Equations 3 and 4 below.

$$Nx>Ny \quad \text{[Equation 3]}$$

$$Nz>Ny \quad \text{[Equation 4]}$$

In Equations 3 and 4, Nx, Ny and Nz are as defined in Equations 1 and 2.

In this case, the second liquid crystal layer may have an in-plane phase difference according to Equation A above in a range of 0 nm to 180 nm. In another example, the phase difference may be about 5 nm or more, 10 nm or more, 15 nm or more, 20 nm or more, 25 nm or more, 30 nm or more, 35 nm or more, 40 nm or more, 45 nm or more, 50 nm or more, 55 nm or more, or 60 nm or more.

In addition, the second liquid crystal layer may have a thickness direction phase difference according to Equation B above in a range of 40 nm to 300 nm.

As described above, the optical film including two liquid crystal layers may have various structures.

For example, the liquid crystal film may have a form that first and second liquid crystal layers (1021, 1022) are formed on both sides of the base film (101), respectively, as shown in FIG. 3, or a form that first and second liquid crystal layers (1021, 1022) are sequentially formed on one side of the base film (101), as shown in FIG. 4.

The present application also relates to a polarizing plate comprising the optical film or liquid crystal layer as described above on one side of a polarizer.

For example, the polarizing plate may comprise a polarizer and a liquid crystal layer formed on one side of the polarizer.

The liquid crystal layer may exhibit transmittance characteristics as described above. For example, the liquid crystal layer comprises a polymerizable liquid crystal compound in a polymerized form and also comprises a radical initiator, provided that the transmittance for the maximum absorption wavelength of the radical initiator may be 52% or more, or 53% or more.

This transmittance may be measured in a state where the liquid crystal layer is placed alone on the base film having the characteristics as mentioned above. The kind of the specific polymerizable liquid crystal compound or the kind of the radical initiator applied to the liquid crystal layer, and the specific range of each transmittance are as described above.

In addition, the kind of the above used polarizer is not particularly limited, and for example, a known polarizer, such as a PVA (poly(vinyl alcohol)0 film, can be used.

In addition, although the case where the liquid crystal layer is present on one side of the polarizer has been described, the above-described optical film may be present on one side of the polarizer as it is instead of the liquid crystal layer.

Such a polarizing plate, liquid crystal layer or optical film may be used in various display devices.

The present application provides an optical film. By controlling transmittance of a liquid crystal layer comprising a radical initiator for the maximum absorption wavelength of the radical initiator, the present application can provide an optical film having a liquid crystal layer having excellent resistance to external stimuli and excellent optical properties. Such an optical film can have various forms and can be used in various fields.

EXAMPLES

Hereinafter, the present application will be described in detail through examples and comparative examples, but the scope of the present application is not limited by the following examples.

1. Transmittance Evaluation of Optical Film

Transmittance for an optical film on which a base film, an alignment layer and a liquid crystal layer were sequentially formed was evaluated according to the manufacturer's manual using U-3310 equipment from Hitachi, where the reference wavelength of the transmittance evaluation was 310 nm.

2. Transmittance Evaluation of Optical Stain

Two composite polarizing plates produced in each of the Examples and Comparative Example were attached to both sides of a glass substrate so that the light absorption axes of the composite polarizing plates were crossed by 90 degrees using a roll-to-roll apparatus as shown in FIG. 5, the glass substrate with the polarizing plates attached was disposed on a light source and while it was irradiated with light, it was evaluated whether or not optical stains occurred. Upon attachment of the polarizing plate, a known pressure-sensitive adhesive was formed on one side of each composite polarizing plate produced in the Examples and Comparative Example, the composited polarizing plate (503) and the glass substrate (504) were pressed and attached with the rolls (501, 502) while transferring them as in FIG. 5, and the polarizing plates (503) were attached to both sides of the glass substrate (504) by the same process as FIG. 5.

Example 1

As the base film, a COP (cycloolefin polymer) film having transmittance of about 88% to 90% at a wavelength in a range of 300 to 310 nm was used. First, an alignment layer was formed on the base film. First, a photo-alignment layer material was coated on one side of the COP film to have a thickness of about 100 nm after drying, and dried in an oven at 80° C. for 2 minutes. As the photo-alignment layer material, a material containing cinnamate group-containing polynorbomene as an orientational compound and a radical initiator (Igacure 184, maximum absorption wavelength: about 330 nm to 350 nm) in an appropriate ratio was used (polynorbomene:initiator=1:0.125 (weight ratio)). Subsequently, the orientation treatment was performed by irradiating the coated alignment layer material with linearly polarized ultraviolet rays (wavelength: about 330 to 350 nm, intensity: about 300 mW/cm$^2$).

Subsequently, a liquid crystal composition was coated on the alignment layer. As the liquid crystal composition, a composition comprising a polymerizable liquid crystal compound (a liquid crystal mixture from Merck) and a radical initiator (Igacure 907, maximum absorption wavelength: about 300 to 310 nm) (weight ratio=polymerizable liquid crystal compound: radical initiator=about 95:5) was used. The composition was applied to the alignment-treated alignment layer so as to have a dry thickness of about 1 μm or so, and oriented according to the orientation of the lower alignment layer, and then irradiated with ultraviolet rays (wavelength: 300 to 310 nm, intensity: about 1,000 mW/cm$^2$) to polymerize the liquid crystal compound, and the liquid crystal layer orientated according to the orientation of the photo-alignment layer was formed to manufacture an optical film. Upon the ultraviolet irradiation, the exposure amount was adjusted to about 110% or so.

Subsequently, the produced optical film was attached to one side of a general PVA (poly(vinyl alcohol))-based polarizing plate to produce a composite polarizing plate.

Example 2

An optical film was produced in the same manner as in Example 1, except that the exposure amount of the ultraviolet ray was adjusted to about 105% when the liquid crystal layer was formed, and a composite polarizing plate was produced using the same.

Example 3

An optical film was produced in the same manner as in Example 1, except that the exposure amount of the ultraviolet ray was adjusted to about 120% when the liquid crystal layer was formed, and a composite polarizing plate was produced using the same.

Comparative Example 1

An optical film was produced in the same manner as in Example 1, except that the exposure amount of the ultraviolet ray was adjusted to about 100% when the liquid crystal layer was formed, and a composite polarizing plate was produced using the same.

The transmittance (310 nm) and the optical stain occurrence measured for each optical film produced in the Examples and Comparative Example were summarized and described in Table 1 below.

TABLE 1

|  | Transmittance (310 nm) | Optical stain occurrence |
| --- | --- | --- |
| Example 1 | 54.9% | Not occurred |
| Example 2 | 54.3% | Not occurred |
| Example 3 | 57.7% | Not occurred |
| Comparative Example 1 | 51.3% | Occurred |

From the results of Table 1, the transmittance of the optical film for the maximum absorption wavelength of the radical initiator can be controlled by controlling the polymerization conditions of the liquid crystal compound, for example, the ultraviolet exposure amount and the like, whereby it can be confirmed that the physical properties of the liquid crystal layer are controlled.

The invention claimed is:

1. An optical film, comprising:
   a base film; and
   a liquid crystal layer on one side of the base film,
   wherein the liquid crystal layer comprises polymerizable liquid crystal compounds in a polymerized form,
   wherein the liquid crystal layer further comprises a radical initiator in a state before generating radicals, and
   wherein the optical film has a transmittance of 52% to 80% at the maximum absorption wavelength of the radical initiator.

2. The optical film according to claim 1, wherein the base film has transmittance of 80% or more at the maximum absorption wavelength of the radical initiator.

3. The optical film according to claim 1, wherein the maximum absorption wavelength of the radical initiator is 300 nm to 310 nm.

4. The optical film according to claim 1, further comprising an alignment layer between the liquid crystal layer and the base film.

5. The optical film according to claim 4, wherein the alignment layer comprises a radical initiator, and wherein an absolute value of the difference between the maximum absorption wavelength of the radical initiator in the alignment layer and the maximum absorption wavelength of the radical initiator in the liquid crystal layer is 20 nm or more.

6. The optical film according to claim 4, wherein the alignment layer has transmittance of 75% or more at the maximum absorption wavelength of the radical initiator in the liquid crystal layer.

7. An optical film, comprising:
   a first liquid crystal layer; and
   a second liquid crystal layer on one side of the first liquid crystal layer,
       wherein the first liquid crystal layer comprises first polymerizable liquid crystal compounds in a polymerized form,
       wherein the first liquid crystal layer further comprises a first radical initiator in a state before generating radicals,
       wherein the second liquid crystal layer comprises second polymerizable liquid crystal compounds in a polymerized form, wherein the second liquid crystal layer further comprises a second radical initiator in a state before generating radicals, and wherein transmittance of a structure comprising the first liquid crystal layer and the second liquid crystal layer is 25% or more at the maximum absorption wavelength of the first radical initiator or at the maximum absorption wavelength of the second radical initiator.

8. The optical film according to claim 7, wherein the first liquid crystal layer has transmittance in the range of 52% to 80% at the maximum absorption wavelength of the first radical initiator.

9. The optical film according to claim 7, wherein the second liquid crystal layer has transmittance in the range of 52% to 80% at the maximum absorption wavelength of the second radical initiator.

10. The optical film according to claim 7, wherein the first liquid crystal layer has a refractive index relationship according to Equation 1 or 2 below:

$$Nx > Ny = Nz \quad \text{[Equation 1]}$$

$$Nx > Ny > Nz \quad \text{[Equation 2]}$$

wherein Nx, Ny and Nz are the refractive index in the slow axis direction, the refractive index in the fast axis direction and the refractive index in the thickness direction of the liquid crystal layer, respectively.

11. The optical film according to claim 10, wherein the first liquid crystal layer has an in-plane phase difference according to Equation A below in a range of 60 nm to 180 nm:

$$Rin = d \times (Nx - Ny) \quad \text{[Equation A]}$$

wherein Rin is an in-plane phase difference, Nx and Ny are the refractive index in the slow axis direction and the refractive index in the fast axis direction of the liquid crystal layer, respectively, and d is the thickness of the liquid crystal layer.

12. The optical film according to claim 10, wherein the first liquid crystal layer has a thickness direction phase difference according to Equation B below in a range of −130 nm to −40 nm:

$$Rth = d \times (Nz - (Nx + Ny)/2) \quad \text{[Equation B]}$$

wherein, Rth is a thickness direction phase difference, Nx, Ny and Nz are the refractive index in the slow axis direction, the refractive index in the fast axis direction and the refractive index in the thickness direction of the liquid crystal layer, respectively, and d is the thickness of the liquid crystal layer.

13. The optical film according to claim 7, wherein the second liquid crystal layer has a refractive index relationship according to Equations 3 and 4 below:

$$Nx > Ny \quad \text{[Equation 3]}$$

$$Nz > Ny \quad \text{[Equation 4]}$$

wherein, Nx, Ny and Nz are the refractive index in the slow axis direction, the refractive index in the fast axis direction and the refractive index in the thickness direction of the liquid crystal layer, respectively.

14. The optical film according to claim 13, wherein the second liquid crystal layer has an in-plane phase difference according to Equation A below in a range of 0 nm to 180 nm:

$$Rin = d \times (Nx - Ny) \quad \text{[Equation A]}$$

wherein, Rin is an in-plane phase difference, Nx and Ny are the refractive index in the slow axis direction and the refractive index in the fast axis direction of the liquid crystal layer, respectively, and d is the thickness of the liquid crystal layer.

15. The optical film according to claim 13, wherein the second liquid crystal layer has a thickness direction phase difference according to Equation B below in a range of 40 nm to 300 nm:

$$Rth = d \times (Nz - (Nx + Ny)/2) \quad \text{[Equation B]}$$

wherein, Rth is a thickness direction phase difference, Nx, Ny and Nz are the refractive index in the slow axis direction, the refractive index in the fast axis direction and the refractive index in the thickness direction of the liquid crystal layer, respectively, and d is the thickness of the liquid crystal layer.

16. A polarizing plate, comprising:
a polarizer; and
a liquid crystal layer on one side of the polarizer,
wherein the liquid crystal layer comprises polymerizable liquid crystal compounds in a polymerized form,
wherein the liquid crystal layer further comprises a radical initiator in a state before generating radicals, and
wherein the liquid crystal layer has a transmittance of 52% to 80% at the maximum absorption wavelength of the radical initiator.

17. The optical film according to claim 1, wherein the liquid crystal layer comprises polymerizable liquid crystal compound in a non-polymerized state.

18. The optical film according to claim 1, wherein the radical initiator is present in an amount of 1 to 20 parts by weight relative to 100 parts by weight of the polymerizable liquid crystal compounds.

19. The optical film according to claim 7, wherein the first radical initiator and the second radical initiator are present in an amount of 1 to 20 parts by weight relative to 100 parts by weight of the first polymerizable liquid crystal compounds and the second polymerizable liquid crystal compounds, respectively.

* * * * *